United States Patent [19]

Inaba et al.

[11] Patent Number: 4,773,741
[45] Date of Patent: Sep. 27, 1988

[54] ELECTROCHROMIC DISPLAY DEVICE HAVING AUXILIARY ELECTRODE

[75] Inventors: Hiroshi Inaba, Matsusaka; Kiyoshi Nakase, Mie; Yukitoshi Yanagida, Matsusaka; Hiroyuki Nishii, Ise, all of Japan

[73] Assignee: Central Glass Company, Limited, Ube, Japan

[21] Appl. No.: 36,893

[22] Filed: Apr. 9, 1987

[51] Int. Cl.$^4$ ................................................. G02F 1/01
[52] U.S. Cl. .................................................... 350/357
[58] Field of Search ...................... 350/357; 252/408.1, 252/600

[56] References Cited

U.S. PATENT DOCUMENTS 4,229,080 10/1980 Take et al. ........................... 350/357
4,371,236  2/1983 Nicholson ............................ 350/357
4,502,934  3/1985 Gazard et al. ....................... 350/357

FOREIGN PATENT DOCUMENTS 0015175 8/1939 Japan ................................... 350/357
0159134 9/1984 Japan ................................... 350/357
62-38625 3/1987 Japan .

Primary Examiner—Eugene R. LaRoche
Assistant Examiner—Nathan W. McCutcheon
Attorney, Agent, or Firm—Fleit, Jacobson, Cohn & Price

[57] ABSTRACT

The invention relates to an electrochromic (EC) display device having a transparent electrode layer coated with a first EC material which takes on color in its electrochemically oxidized state, such as Prussian blue, and an opposite transparent electrode layer coated with a second EC material which takes on color in its reduced state, such as $WO_3$. For use in initial bleaching or coloration of one of the two EC layers, an auxiliary electrode is disposed in a marginal region of the space between the two opposite electrodes, and an electrolyte occupies the remaining space. An insulating covering permeable to ions intervenes between the electrolyte and the body of the auxiliary electrode, and an insulating layer substantially impermeable to ions intervenes between the auxiliary electrode body and each transparent electrode layer or the overlying EC layer to prevent leakage current. This manner of insulation of the auxiliary electrode is effective in shortening the length of time required for the initial bleaching or coloration treatment and extending memory time of the display device in actual operation.

11 Claims, 1 Drawing Sheet

ELECTROCHROMIC DISPLAY DEVICE HAVING AUXILIARY ELECTRODE

BACKGROUND OF THE INVENTION

This invention relates to an electrochromic display device which utilizes a combination of two types of electrochromic materials one of which takes on color in its electrochemically oxidized state while the other takes on color in its electrochemically reduced state. The display device includes an auxiliary electrode for use in initially reducing one of the two electrochromic materials.

It is known to use a combination of the aforementioned two types of electrochromic materials in an electrochromic display device having oppositely arranged two electrode layers. More particularly, each electrode layer in such a device is comprised of a transparent electrode film deposited on a transparent substrate and a coating layer of an electrochromic material, and the two types of electrochromic materials are assigned to the two electrode layers, respectively. For example, Prussian blue which assumes blue color in its electrochemically oxidized state and becomes colorless by reduction and tungsten trioxide $WO_3$ which is colorless in its electrochemically oxidized state and assumes blue color in a reduced state are used in combination. In operation of the display device, electrochemical oxidation of the electrochromic material of one electrode is accompanied by electrochemical reduction of the opposite electrode. Accordingly simultaneous coloration of the two electrodes and simultaneous bleaching of the two electrodes take place. The primary purpose of this construction is intensifying coloration of the diplay device.

However, it is inevitable that both of the two kinds of electrochromic coating layers as formed are in electrochemically oxidized state, so that one of the two electrodes assumes color whereas the other is colorless. Therefore, it is necessary to accomplish electrochemical reduction of one of the two electrochromic coating layers precedent to actual operation of the electrochromic display device. For use in the initial reduction treatment an auxiliary electrode is disposed in a marginal region of the electrochromic display device, and it is known to use an electrochemically and reversibly oxidizable and reducible substance as the principal material of the auxiliary electrode as shown, for example, in JP-A No. 59-159134 and Japanese utility model application No. 60-129565.

The aforementioned auxiliary electrode is usually provided with an insulating covering the material of which is permeable to ions, so that ions can migrate from the electrolyte confined in the display device to the auxiliary electrode, and vice versa. Such a manner of insulation of the auxiliary electrode offers little problem if the distance between the two substrates of the electrochromic display device is large enough to disposition of the auxiliary electrode without contacting with the transparent electrode films deposited on the substrates or the electrochromic layers formed thereon. However, in recent electrochromic display devices the distance between the two substrates is seldom so large since it is desired to reduce both the total thickness and gross weight of the display device. Then it is almost inevitable that the insulating covering of the auxiliary electrode comes into tight contact with the transparent electrode films or the electrochromic coating layers, and therefore a leakage current flows between the auxiliary electrode and the electrochromic layers. Such a leakage current raises the need of extending the duration of the initial reduction treatment and, besides, in actual operation of the electrochromic display device becomes a cause of a relatively short memory time of the display device, i.e. insufficient capability of maintaining the colored or bleached state after termination of application of the coloration or bleaching voltage.

SUMMARY OF THE INVENTION

It is an object of the present invention to provide an electrochromic display device which utilizes two types of electrochromic materials in the above described manner and includes an auxiliary electrode for use in the initial reduction of the electrochromic material of one of the two opposite electrode layers and in which the manner of insulation of the auxiliary electrode is improved so as to prevent the aforementioned leakage current to thereby shorten the length of time required for the initial reduction and extend the memory time of the display device both at coloration and at bleaching.

An electrochromic display device according to the invention comprises two transparent substrates which are held opposite to and spaced from each other and each of which is laid with a transparent electrode film on the side facing the other substrate, a first electrochromic layer which is formed on the transparent electrode film on one of the two substrates and is formed of a first electrochromic material which takes on color in its electrochemically oxidized state, a second electrochromic layer which is formed on the transparent electrode film on the other substrate and is formed of a second electrochromic material which takes on color in its electrochemically reduced state, an electrolyte which occupies the space between the two substrates and an auxiliary electrode disposed in a marginal region of the space between the two substrates for use in initial reduction of one of the first and second electrochromic layers. The auxiliary electrode comprises an electrode body and an insulating covering which is permeable to ions and with which the electrode body is at least partially covered such that the insulating covering intervenes between the electrolyte and the electrode body. Furthermore, the display device comprises insulating means for insulating the electrode body of the auxiliary electrode from the transparent electrode films. This insulating means comprises two insulating layers which are substantially impermeable to ions and intervene between the auxiliary electrode body and the transparent electrode films on the two substrates, respectively. Each of the first and second electrochromic layers may or may not intervene between the underlying transparent electrode film and each insulating layer substantially impermeable to ions.

As to the principal material of the auxiliary electrode body, it is preferred to use an electrochemically and reversibly oxidizable and reducible substance such as, for example, polytriphenylamine with addition of an electroconductive material such as carbon black and a binder according to the need.

For example, the first electrochromic material is Prussian blue and the second electrochromic material is $WO_3$. In this case the initial reduction, and resultant bleaching, of the Prussian blue layer in the electrochromic display device is accomplished by applying a voltage across the Prussian blue electrode and the auxiliary electrode so as to produce a potential difference of about −0.8 V between the Prussian blue electrode and the auxiliary electrode. Such a potential difference causes injection of cations of the electrolyte and electrons into the Prussian blue layer so that Prussian blue is reduced and becomes colorless. In subsequent operation of the display device coloration of both the Prussian blue electrode and the $WO_3$ electrode is accomplished by applying a voltage of about +1.0 V between the Prussian blue electrode and the $WO_3$ electrode, and bleaching of both electrodes is accomplished by applying a reverse voltage.

In the electrochromic display device according to the invention, only an insulating covering permeable to ions intervenes between the electrolyte and the auxiliary electrode body. In other words, only this insulating covering is on the auxiliary electrode body surface(s) facing the electrolyte. Accordingly, transfer of ions at the initial reduction treatment is not obstructed. For example, the ion permeable insulating covering material is an insulating paper or a nonwoven cloth of a synthetic fiber. In addition, an insulator substantially impermeable to ions is interposed between the auxiliary electrode body and the transparent electrode film on each substrate. For example, polyethylene sheet or polytetrafluoroethylene sheet is used as the ion impermeable insulator, and in such a case the insulator sheet is placed on the auxiliary electrode body surfaces facing the substrates. Alternatively, a dielectric oxide film is deposited on the transparent electrode of each substrate in a marginal region facing the auxiliary electrode. The ion impermeable insulator prevents flow of a leakage current between the auxiliary electrode and either of the two electrochromic electrodes even though the insulated auxiliary electrode is in tight contact with the transparent electrode films or the electrochromic layers thereon.

Since the auxiliary electrode is insulated in the above described manner the initial reduction treatment of an electrochromic display device according to the invention can be accomplished in a relatively short time. Furthermore, the memory time of the display device remarkably extends both at coloration and at bleaching. Besides the use in the initial reduction treatment, the auxiliary electrode is of use for a recovering treatment which is performed when the balance of oxidation and reduction between the first and second electrochromic layers is lost by some reasons such as accumulation of ions resulting from repeated coloration and bleaching and/or deterioration by the influence of impurity matter.

DESCRIPTION OF THE PREFERRED EMBODIMENTS

Figure 1:
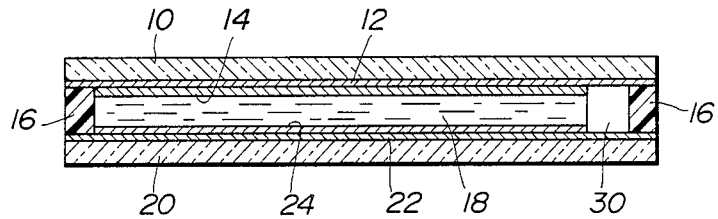
FIG. 1 is a schematic and sectional illustration of an electrochromic display device in which the present invention is embodied.

FIG. 1 shows a general construction of an electrochromic (EC) display device according to the invention. The device has oppositely arranged top and bottom substrates 10 and 20 both of which are transparent and usually made of glass. A transparent electrode film 12 is deposited on the inner surface of the top substrate 10, and, as a display electrode, a first EC layer 14 is formed on the electrode film 12. This display electrode 14 is formed of a first EC material which assumes a characteristic color in an electrochemically oxidized state. A transparent electrode film 22 is deposited on the inner surface of the bottom substrate 20, and, as a counter electrode, a second EC layer 24 is formed on the electrode film 22. The counter electrode 24 is formed of a second EC material which assumes a characteristic color in an electrochemically reduced state. Alternatively, the display electrode 14 may be formed of the second EC material and the counter electrode 24 of the first EC material. The two substrates 10 and 20 are held spaced from each other by a thin layer 16 of a sealing material, which is applied peripherally of the substrates 10, 20 so as to surround the EC layers 14, 24. An auxiliary electrode 30 for use in the initial reduction treatment described hereinbefore is disposed in a side marginal region of the space defined between the two opposite substrates 10 and 20. In this marginal region both the display electrode layer 14 and the counter electrode layer 24 may be omitted as is illustrated. The auxiliary electrode is insulated from the transparent electrode films 12, 22 and from the display and counter electrodes 14, 24. The auxiliary electrode 30 comprises an electroconductive material and a substance which is electrochemically and reversibly oxidizable and reducible inversely of reduction and oxidation of one or the other of the aforementioned first and second EC materials. The remaining space in the EC display device is filled with an electrolyte liquid 18.

The transparent electrode films 12, 22 are usually formed of $SnO_2$ or $In_2O_3$. A typical example of the first EC material which takes on color in an oxidized state is Prussian blue which is a complex represented by the formula $Fe_4^{III}[Fe^{II}(CN)_6]_3$, and other practicable examples are iridium oxide $IrO_2$, nickel oxyhydroxide NiOOH, cuprous oxide $Cu_2O$ and polytriphenylamine. A typical example of the second EC material which takes on color in a reduced state is $WO_3$, and other practicable examples are $MoO_3$, $V_2O_3$, $Nb_2O_3$ and $TiO_2$. The electrolyte liquid 18 is usually a solution of $LiClO_4$ or $NaClO_4$ in an organic polar solvent such as propylene carbonate or acetonitrile. If desired such an electrolyte solution may be gelled by using a suitable polymer such as polyethylene oxide or polymethyl methacrylate. Also it is possible to use a solid electrolyte such as $H_3PO_4(WO_3)_{12}.29H_2O$, LiN or LiI instead of a liquid or gelled electrolyte. Suitable examples of the electrochemically oxidizable and reducible material used in the auxiliary electrode 30 is polytriphenylamine, Prussian blue, polypyrrole and polythiophene.

Figure 2:
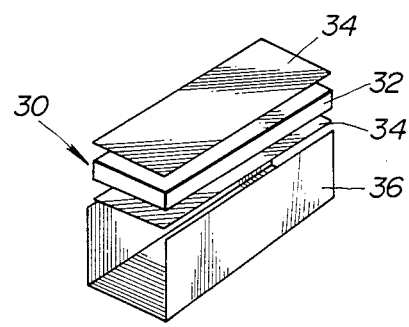
FIG. 2 is an exploded view of an auxiliary electrode included in the device of FIG. 1.
Figure 3:
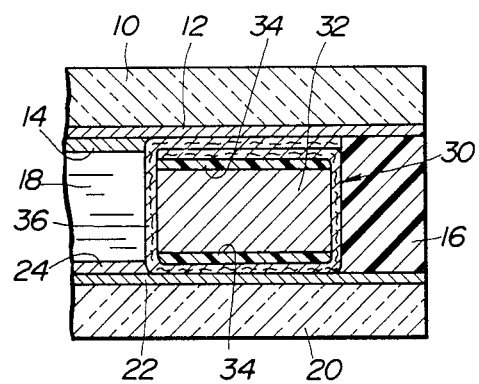
FIG. 3 is an explanatorily enlarged sectional view of the auxiliary electrode in the device of FIG. 1.

The auxiliary electrode 30 comprises insulating means as mentioned hereinbefore. FIGS. 2 and 3 show a preferred embodiment of the insulating means. Numeral 32 indicates the electrode body of the auxiliary electrode 30 in the form of a rectangular strip. For insulation of the electrode body 32 against the transparent electrode films 12 and 22, both the top and bottom surfaces of the electrode body 32 are covered with an insulating sheet 34 which is impermeable to ions. Then the laminate of the insulating sheets 34 and the electrode body 32 is tightly wrapped up with a different kind of insulating sheet 36 which is permeable to ions. As can be seen in FIG. 3, the ion permeable sheet 36 provides ionic communication between the body 32 of the auxiliary electrode 30 and the electrolyte 18. In the device illustrated in FIGS. 1 and 3 the insulated auxiliary electrode 30 is in contact with the transparent electrode films 12, 22. However, it is optional and raises no problem to expand the display electrode layer 14 and the counter electrode layer 24 into the marginal region of the device where the auxiliary electrode 30 is disposed. In such a case the ion impermeable sheets 34 insulate the electrode body 32 against the EC layers of the display and counter electrodes 14 and 24.

The material of the ion impermeable sheets 34 is either an organic insulating material such as polyethylene, polytetrafluoroethylene, polystyrene, polyethylene terephthalate, polypropylene, polyvinyl chloride, polycarbonate or nylon or an inorganic insulating material such as mica or quartz glass. The ion permeable sheet 36 is, for example, an insulating paper or a nonwoven cloth of a synthetic fiber such as rayon, polyamide, polypropylene, polyester or polyacrylate.

Figure 4:
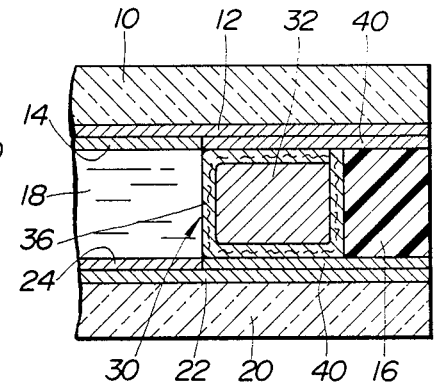
FIG. 4 shows a modification of the auxiliary electrode of FIG. 3 in a similar view.

FIG. 4 shows another embodiment of the insulating means of the auxiliary electrode 30. In the side marginal region of the device where the auxiliary electrode 30 is disposed the EC layers 14, 24 are omitted, and an insulating film 40 of an electrochemically stable material such as $SiO_2$ is deposited on each of the opposite transparent electrode films 12 and 22. These insulating films 40 are impermeable to ions. The body 32 of the auxiliary electrode 30 is tightly wrapped up with the aforementioned insulating sheet 36 permeable to ions and, in that state, is held between the transparent electrodes 12 and 22 each covered with the insulating film 40. The insulating films 40 can be formed by a well known technique such as physical vapor deposition, chemical vapor deposition or a thermal decomposition method. It is optional to omit the insulating films 40 in the peripheral region of the device such that the seal layer 16 makes direct contact with the transparent electrode films 12, 22.

EXAMPLE

An electrochromic display device of the construction shown in FIG. 1 was produced. The auxiliary electrode 30 was insulated in the manner shown in FIGS. 2 and 3.

The transparent substrates 10 and 20 were 100 mm × 100 mm glass plates, and the transparent electrode films 12 and 22 were formed by vacuum deposition of $SnO_2$. As the EC layer of the display electrode 14 a film of $WO_3$, which assumes blue color in its reduced state, was formed by vacuum deposition. As the EC layer of the counter electrode 24, a film of Prussian blue, which assumes blue color in its oxidized state, was formed by an electrolytic synthesis and deposition method.

The body 32 of the auxiliary electrode 30 was formed by the steps of kneading a mixture of 6 parts by weight of polytriphenylamine powder, 3 parts by weight of carbon powder and 1 part by weight of polytetrafluoroethylene dispersion powder, press-shaping the kneaded mixture into a sheet and press-bonding two pieces of the obtained sheet to a meshwork (openings 40-50 microns) of metallic titanium which is an electrochemically inactive material. A polyethylene sheet was used as the insulating sheets 34 impermeable to ions and an insulating paper as the insulating sheet 36 permeable to ions. After wrapping up the laminate of the electrode body 32 and the polyethylene sheets 34 with the insulating paper 36, pressure and heat were applied to locally weld the insulating paper 36 to the polyethylene sheets 34.

The thus insulated auxiliary electrode 30 was placed between the two substrates 10 and 20 in a side marginal region where the transparent electrode films 12, 22 were left exposed. Then the peripheral seal layer 16 was formed to a thickness of 1 mm by using butyl rubber and Thiokol rubber.

The insulated auxiliary electrode 30 was in contact with the transparent electrode films 12, 22, but the auxiliary electrode body 32 was surely insulated from the electrode films 12, 22 by not only the insulating paper 36 but also the intervening polyethylene sheets 34. As the electrolyte liquid 18, 1 mole/liter solution of $LiClO_4$ in propylene carbonate was introduced into the space between the two substrates 10 and 20 through an opening in the seal layer 16, and thereafter the opening was sealed. In the completed EC display device, only the ion permeable insulating paper 36 intervened between the electrolyte 18 and a side face of the body 32 of the auxiliary electrode 30.

In the thus produced EC display device the $WO_3$ film 14 of the display electrode was colorless, whereas the Prussian blue film 24 of the counter electrode assumed blue color. The Prussian blue film 24 as electrodeposited was at a natural potential of +0.3 V with respect to the auxiliary electrode 30. To accomplish initial reduction and resultant bleaching of the Prussian blue film 24, a reverse voltage was applied across the counter electrode 24 and the auxiliary electrode 30 so as to gradually lower the potential of the counter electrode 24 at a rate of 5-10 mV/min. In about 2 hr the potential of the counter electrode or Prussian blue film 24 became −0.8 V with respect to the auxiliary electrode 30, and this state was maintained for another 1 hr. That is, the total time of the reduction treatment was about 3 hr. By this treatment the Prussian blue film 14 turned colorless and transparent, whereby initial bleaching of the EC display device was accomplished.

Following the initial bleaching treatment the coloration function of the EC display device was tested by applying a DC voltage of +1 V between the counter electrode 24 using Prussian blue and the display electrode 14 using $WO_3$. Then coloration of both the Prussian blue film 24 and the $WO_3$ film 14 took place, and in about 30 sec a clear and deep color was exhibited uniformly over the entire display area of the device. In this state visible light transmittance of the EC display device was 5%. After that the application of the voltage was terminated, and the EC display device was left standing. There was little change in the intensity of the blue color, and in 24 hr the amount of increase in the light transmittance was only 0.2-0.4%. Thus, this EC display device proved to be considerably improved in the so-called coloration memory time.

Next, a DC voltage of −0.5 V was applied between the counter electrode 24 of Prussian blue and the display electrode 14 of $WO_3$. In about 1 min complete and uniform bleaching took place over the entire display area, whereby the EC display device turned a transparent cell which exhibited visible light transmittance of 80%. Then the application of the voltage was terminated. The EC display device remained in the bleached state, and in 24 hr the amount of decrease in the light transmittance was only 0.2-0.4%. Thus, this EC display device proved to be considerably improved in the so-called bleaching memory time too.

COMPARATIVE EXAMPLE

Another EC display device was produced by repeating the process described in the foregoing example except that the auxiliary electrode body 32 was directly wrapped up with the ion permeable insulating paper 36 without using the polyethylene sheets 34.

The initial reduction (bleaching) of the Prussian blue film 24 in the obtained EC display device was performed by the method described in the Example. In this case it took 4 hr to complete the initial bleaching treatment. After that the function of the EC display device was tested by the same methods as in the Example. After terminating application of the coloration voltage, the amount of increase in the light transmittance of the EC display device was 2.8–40.5% in 24 hr. After terminating application of the bleaching voltage the amount of decrease in the light transmittance of the device was 3.5–50.3% in 24 hr.

What is claimed is:

1. An electrochromic display device comprising:
two transparent substrates which are held opposite to and spaced from each other and each of which is laid with a transparent electrode film on the side facing the other substrate;
a first electrochromic layer which is formed on the transparent electrode film on one of the two substrates and is formed of a first electrochromic material which takes on color in its electrochemically oxidized state;
a second electrochromic layer which is formed on the transparent electrode film on the other of the two substrates and is formed of a second electrochromic material which takes on color in its electrochemically reduced state;
an electrolyte which occupies the space between the two substrates;
an auxiliary electrode disposed in a marginal region of the space between the two substrates for use in initial reduction of one of the first and second electrochromic layers, the auxiliary electrode comprising an electrode body comprising an electroconductive material and an electrochemically oxidizable and reducible substance, two insulating layers laid directly on opposite surfaces of said electrode body to intervene between said electrode body and the transparent electrode films on the two substrates and to insulate said electrode body from the two transparent electrode films, each of said two insulating layers being an organic polymer sheet which is substantially impermeable to ions, and an insulating covering which is permeable to ions and at least partially covers said electrode body such that said insulating covering intervenes between said electrolyte and said electrode body, said insulating covering being wrapped around said electrode body and said two insulating layers.

2. A device according to claim 1, wherein said first and second electrochromic layers are absent in said marginal region, and said insulating covering makes contact with the transparent electrode film on each of the two substrates.

3. A device according to claim 1, wherein said first and second electrochromic layers intervene between said insulating covering and the transparent electrode films on the two substrates, respectively.

4. A device according to claim 1, wherein the material of said insulating covering permeable to ions is an insulating paper.

5. A device according to claim 1, wherein the material of said insulating covering permeable to 6. A device according to claim 1, wherein said electrochemically oxidizable and reducible substance is a polymer selected from the group consisting of polytriphenylamine, polypyrrole and polythiophene.

7. A device according to claim 1, wherein said first electrochromic material is selected from the group consisting of Prussian blue, iridium oxide, nickel oxyhydroxide, cuprous oxide and polytriphenylamine.

8. A device according to claim 7, wherein said second electrochromic material is selected from the group consisting of $WO_3$, $MoO_3$, $V_2O_3$, $Nb_2O_3$ and $TiO_2$.

9. A device according to claim 1, wherein said electrolyte is a solution.

10. A device according to claim 1, wherein said electrolyte is a gelled solution comprising an organic polymer.

11. A device according to claim 1, wherein said electrolyte is a solid electrolyte.

* * * * *